(12) United States Patent
Cho

(10) Patent No.: US 7,584,679 B2
(45) Date of Patent: Sep. 8, 2009

(54) MANUAL TRANSMISSION

(75) Inventor: Hang Cheol Cho, Gunpo (KR)

(73) Assignee: Hyundai Motor Company, Seoul (KR)

( * ) Notice: Subject to any disclaimer, the term of this patent is extended or adjusted under 35 U.S.C. 154(b) by 291 days.

(21) Appl. No.: 11/305,731

(22) Filed: Dec. 15, 2005

(65) Prior Publication Data
US 2007/0119273 A1    May 31, 2007

(30) Foreign Application Priority Data
Nov. 29, 2005  (KR) .................. 10-2005-0114998

(51) Int. Cl.
*F16H 3/08* (2006.01)
(52) U.S. Cl. .................. 74/325; 74/331; 74/359
(58) Field of Classification Search .............. 74/473.36, 74/473.37, 325, 331, 339, 359
See application file for complete search history.

(56) References Cited

U.S. PATENT DOCUMENTS

| 1,928,782 A | * | 10/1933 | Church ..................... 74/473.33 |
| 4,094,206 A | * | 6/1978 | Sogo et al. .................... 74/360 |
| 4,852,421 A | * | 8/1989 | Kerboul ................... 74/473.21 |

FOREIGN PATENT DOCUMENTS

| AT | 146230 B | 6/1936 |
| JP | 2005-024007 | 1/2005 |

* cited by examiner

*Primary Examiner*—Charles A Marmor
*Assistant Examiner*—Derek D Knight
(74) *Attorney, Agent, or Firm*—Morgan, Lewis & Bockius LLP

(57) ABSTRACT

A manual transmission includes two synchronizers, and manufacturing costs are here reduced and manufacturing processes simplified.

3 Claims, 2 Drawing Sheets

MANUAL TRANSMISSION

CROSS-REFERENCE TO RELATED APPLICATION

This application claims priority to and the benefit of Korean Patent Application No. 10-2005-0114998 filed in the Korean Intellectual Property Office on Nov. 29, 2005, the entire contents of which are incorporated herein by reference.

BACKGROUND OF THE INVENTION (a) Field of the Invention

The present invention relates to a manual transmission. More particularly, the present invention relates to a manual transmission including only two synchronizers.

(b) Description of the Related Art

Generally, a power generated in an engine of a vehicle is shifted in a transmission and then output.

That is, the power input to the transmission is transmitted to an output shaft through an operating gear of a counter shaft of the transmission.

A synchronizer of a manual transmission mounted to the transmission synchronizes a rotating speed of the counter shaft with a rotating speed of the output shaft when a gear is shifted, and engages a gear at the corresponding shift-speed.

Synchronizing means making the rotation speed of the counter shaft the same as the rotation speed of the output shaft and, according to the prior art, synchronizers are mounted for each respective shift-speed for synchronization when a gear is shifted.

That is, according to the prior art, in a vehicle including the transmission, if a driver operates a shift lever, a corresponding shift lug operates by an operation of a control finger connected to the shift lever.

And then, the counter shaft and the output shaft are synchronized and shifting is realized by a sleeve of the synchronizer being moved by an operation of a shift fork connected to the corresponding shift lug.

However, according to the prior art, because the synchronizers have to be mounted for the respective shift-speeds, problems occur that a manufacturing process of the transmission is complicated and manufacturing costs increase.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a manual transmission having advantages of a reduced number of synchronizers.

An exemplary manual transmission transmitting a power from a counter shaft to an output shaft according to an embodiment of the present invention includes an output shaft, a plurality of driven gears being selectively engaged to the output shaft to selectively transmit a power shifted by speed ratios thereto, a counter shaft transmitting the power to the plurality of driven gears and including a plurality of drive gears corresponding to the plurality of driven gears, a first synchronizer synchronizing a rotation speed of the driven gear engaged to the output shaft to a rotation speed of the counter shaft in a case that one of the driven gears is engaged to the output shaft to selectively transmit power, and a plurality of second synchronizers engaging the driven gear to the output shaft such that the driven gear transmits the power of the counter shaft to the output shaft after the rotation speed is synchronized. There is exactly one first synchronizer, and one less second synchronizer than driven gears.

The first synchronizer includes a sleeve connected to the output shaft to be able to move in an axial direction of the output shaft, a key assembly supporting the sleeve, a synchronizer assembly synchronizing the rotation speed of the output shaft to the rotation speed of the counter shaft by connecting with the sleeve, a hub transmitting the power to the sleeve, and a gear clutch transmitting the power from the driven gear to the output shaft.

Each second synchronizer includes a sleeve connected to the output shaft to be able to move in an axial direction of the output shaft, a hub transmitting the power to the sleeve, and a gear clutch transmitting the power from the driven gear to the output shaft.

An exemplary manual transmission further includes a control finger operating such that the driven gear is engaged to a predetermined shift-speed, and a plurality of shift lugs corresponding to the predetermined shift-speeds and operating the first and second synchronizers by an operation of the control finger.

The control finger includes a first finger operating the first synchronizer, and a second finger operating the second synchronizers. The shift lugs include a first shift lug operated by the first finger such that the first synchronizer is operated, and a plurality of second shift lugs operated by the second finger such that the second synchronizers are operated.

The first synchronizer is operated together with one of the plurality of second synchronizers.

The second finger and the first finger are formed to operate the first shift lug together with one of the plurality of second shift lugs.

DETAILED DESCRIPTION OF THE EXEMPLARY EMBODIMENT

An exemplary embodiment of the present invention will hereinafter be described in detail with reference to the accompanying drawings.

Figure 1:
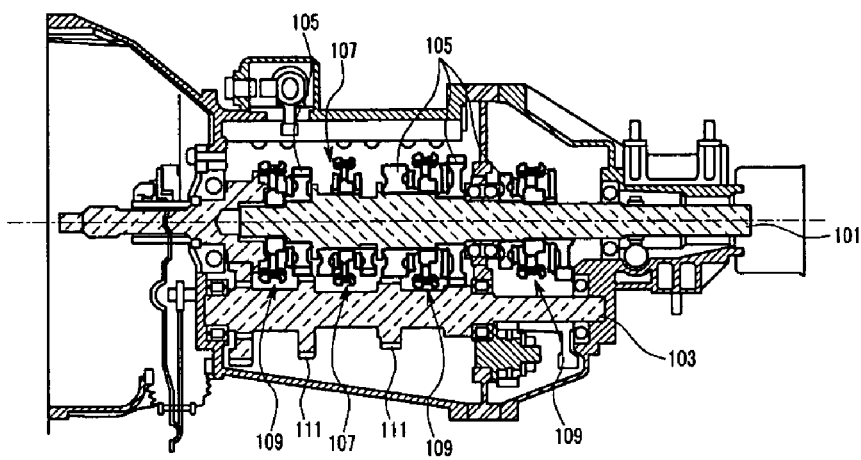
FIG. 1 shows a manual transmission according to an exemplary embodiment of the present invention.

As shown in FIG. 1, according to the exemplary embodiment of the present invention, a manual transmission transmitting a power from a counter shaft 103 to an output shaft 101 includes an output shaft 101, a plurality of driven gears 105, a counter shaft 103, a first synchronizer 107, and a plurality of second synchronizers 109.

The power generated from an engine (not shown) is input to the counter shaft 103 and the plurality of driven gears 105 are selectively engaged to the output shaft 101 to selectively transmit a power shifted by speed ratios thereto.

The counter shaft 103 transmits the power to the driven gears 105 and includes a plurality of drive gears 111 corresponding to the plurality of driven gears 105.

The first synchronizer 107 synchronizes a rotation speed of the driven gear 105 engaged to the output shaft 101 to a rotation speed of the counter shaft 103 in a case that one of the driven gears 105 is engaged to the output shaft 101 to selectively transmit the power.

The plurality of second synchronizers 109 engage the selected driven gear 105 to the output shaft 101 such that the receiving gear transmits the power of the counter shaft 103 to the output shaft 101 after the rotation speed is synchronized.

That is, in a case where none of the drive gears 105 are engaged to the output shaft 101, the output shaft 101 does not receive the power from the counter shaft 103.

However, in a case that one of the driven gears 105 is engaged to the output shaft 101, the output shaft 101 receives the power from the counter shaft 103.

In the case that one of the driven gears 105 is engaged to the output shaft 101, the first synchronizer 107 synchronizes a speed of the output shaft 101 to a speed of the counter shaft 103.

If the rotation speed of the output shaft 101 is synchronized to the rotation speed of the counter shaft 103, the selected driven gear 105 is engaged to the output shaft 101 by the second synchronizers 109.

The selected driven gear 105 engaged to the output shaft 101 transmits the power from the corresponding drive gear 111 of the counter shaft 103.

Because a detailed description of which one of the driven gears 105 is engaged to the output shaft 101 is obvious to a person of ordinary skill in the art, it is omitted herein.

According to the exemplary embodiment of the present invention, there is exactly one first synchronizer 107, and one less second synchronizer 109 than driven gears 105.

That is, because there is exactly one first synchronizer 107 for synchronization, synchronization is realized at a point of the output shaft 101 at which the first synchronizer 107 is located.

In addition, because there is one less second synchronizer 109 than driven gears 105, shifting corresponding to the respective shift-speeds is realized by the second synchronizers 109.

Figure 2:
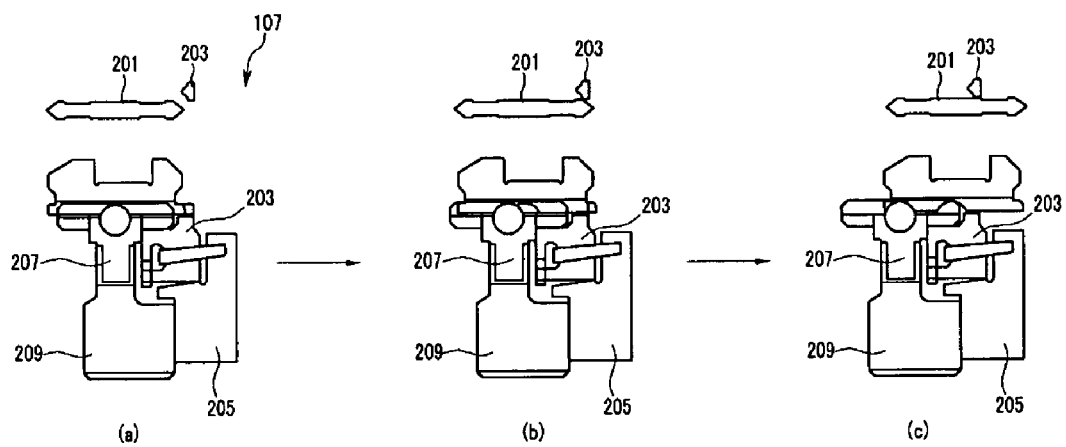
FIG. 2 shows an operation of a first synchronizer according to the exemplary embodiment of the present invention.
Figure 3:
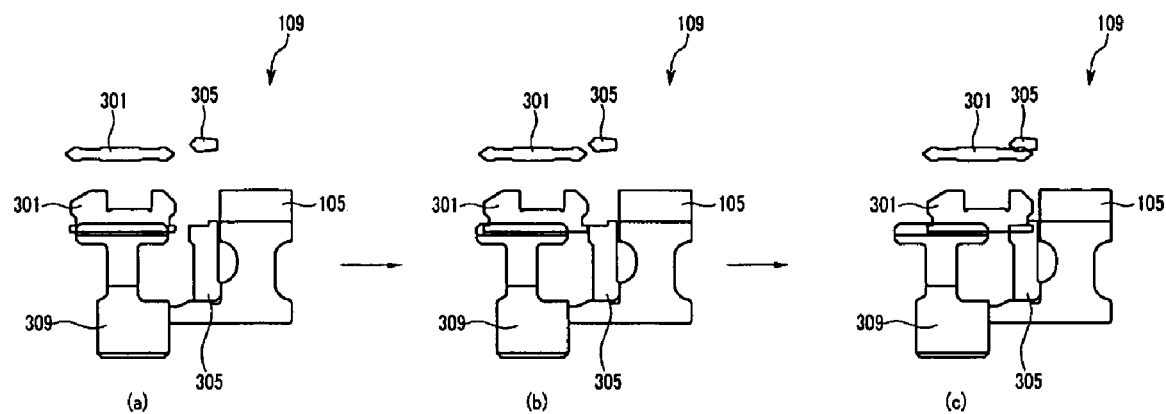
FIG. 3 shows an operation of a second synchronizer according to the exemplary embodiment of the present invention.

More particularly, drawings (a) in FIG. 2 and FIG. 3 show a state where a driven gear 105 is not engaged with the output shaft 101.

Drawing (b) in FIG. 2 shows a state that the first synchronizer 107 is synchronized, and drawing (b) in FIG. 3 shows a state of the second synchronizers 109 in the state that the synchronization of the first synchronizer 107 is completed.

Drawings (c) in FIG. 2 and FIG. 3 show the first and second synchronizers 107 and 109 when an engagement is completed.

As shown in FIG. 2, the first synchronizer 107 includes a sleeve 201, a key assembly 207, a synchronizer assembly 203, a hub 209, and a gear clutch 205.

The sleeve 201 is connected to the output shaft 101 to be able to move in an axial direction of the output shaft 101 and the key assembly 207 supports the sleeve 201.

The synchronizer assembly 203 synchronizes the rotation speed of the output shaft 101 to the rotation speed of the counter shaft 103 by connecting with the sleeve 201, and the hub 209 transmits the power to the sleeve 201.

The gear clutch 205 transmits the power from the driven gears 105 to the output shaft 101.

As shown in FIG. 2, synchronization is realized by the sleeve 201 of the first synchronizer 107 being connected to the synchronizer assembly 203 by the sleeve 201 moving rightward in FIG. 2.

In addition, as shown in FIG. 3, according to the exemplary embodiment of the present invention, each second synchronizer 109 includes a sleeve 301, a hub 309, and a gear clutch 305 and operations of the respective constituent elements are the same as the operation of the constituent elements of the first synchronizer 107.

Because the second synchronizers 109 only include the constituent elements for engaging the corresponding driven gear 105 to the output shaft 101, a scheme of the second synchronizers 109 is simple.

Therefore, according to the exemplary embodiment of the present invention, because the synchronizers of the manual transmission have a much simpler scheme, manufacturing costs may be reduced and a manufacturing process may be simplified.

If the rotation speed of the output shaft 101 is synchronized to the rotation speed of the counter shaft 103 by the first synchronizer 107, the second synchronizers 109 engage the corresponding driven gear 105 to the output shaft 101.

Therefore, the power of the counter shaft 103 is transmitted to the output shaft 101.

Figure 4:
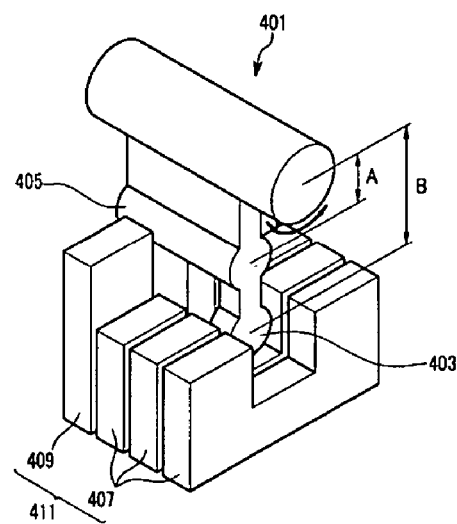
FIG. 4 shows a control finger and a shift lug according to the exemplary embodiment of the present invention.

FIG. 4 shows a control finger and a shift lug according to the exemplary embodiment of the present invention.

According to the exemplary embodiment of the present invention, the manual transmission includes one first synchronizer 107 and the plurality of second synchronizers 109.

Therefore, according to the exemplary embodiment of the present invention, because the manual transmission has to operate the first synchronizer 107 together with the second synchronizers 109, the manual transmission includes a control finger 401 and a plurality of shift lugs 411 different from those of the prior art.

Referring to FIG. 4, the control finger 401 operates such that the driven gears 105 are respectively engaged to predetermined shift-speeds and the plurality of shift lugs 411 operate the first and second synchronizers 107 and 109 by an operation of the control finger 401 and are realized as the same number as the number of predetermined shift-speeds.

The control finger 401 includes a first finger 405 being operated to operate the first synchronizer 107 and a second finger 403 being operated to operate the second synchronizers 109.

In addition, the shift lugs 411 include a first shift lug 409 operated by the first finger 405 to operate the first synchronizer 107 and a plurality of second shift lugs 407 operated by the second finger 403 to operate the second synchronizers 109.

The control finger 401 is connected to a shift lever (not shown). Therefore, if a driver operates the shift lever, the control finger 401 operates.

That is, if the control finger 401 rotates clockwise or counterclockwise after the control finger 401 moves in an axial direction of the control finger 401 (referring to the arrow in FIG. 4), a corresponding shift lug 411 moves.

According to the exemplary embodiment of the present invention, the manual transmission includes the first synchronizer 107 and the second synchronizers 109.

As described, in order to realize a shifting, the first synchronizer 107 and the second synchronizers 109 have to be operated together.

That is, the first synchronizer 107 and one of the plurality of second synchronizers 109 are operated together.

In other words, the second finger 403 and the first finger 405 are formed to operate the first shift lug 409 together with one of the plurality of second shift lugs 407.

Therefore, as shown in FIG. 4, the first finger 405 and the second finger 403 are integrally formed.

The reference numeral A in FIG. 4 illustrates a length of the first finger 405 and the reference numeral B illustrates a length of the second finger 403.

Therefore, the first shift lug 409 and one of the second shift lugs 407 may be simultaneously operated.

If the control finger 401 rotates, the first finger 405 operates the first shift lug 409, and simultaneously, the second finger 403 operates one of the second shift lugs 407 corresponding to the shift-speed which is being changed to.

If the first shift lug 409 and one of the second shift lugs 407 are operated, a shift rail (not shown) and a shift fork (not shown) connected to the sleeves 201 and 301 of the first synchronizer 107 and the second synchronizers 109 operate.

In conclusion, the first synchronizer 107 and the second synchronizers 109 are simultaneously operated.

Because the shift rail and the shift fork are obvious to a person of an ordinary skill in the art, the detailed description is omitted herein.

According to the exemplary embodiment of the present invention, because only one synchronizer for synchronization is mounted, constituent elements of the manual transmission may be simplified.

Therefore, a manufacturing process of the manual transmission is simplified and manufacturing costs may be reduced.

While this invention has been described in connection with what is presently considered to be the most practical exemplary embodiment, it is to be understood that the invention is not limited to the disclosed embodiment, but, on the contrary, is intended to cover various modifications and equivalent arrangements included within the spirit and scope of the appended claims.

What is claimed is:

1. A manual transmission transmitting power from a counter shaft to an output shaft, the manual transmission comprising:

the output shaft;

a plurality of driven gears being selectively engaged to the output shaft to selectively transmit a power shifted by speed ratios thereto;

the counter shaft transmitting the power to the plurality of driven gears and including a plurality of drive gears corresponding to the plurality of driven gears;

a first synchronizer synchronizing a rotation speed of one of the driven gears engaged to the output shaft to a rotation speed of the counter shaft when one of the driven gears is engaged to the output shaft to selectively transmit the power;

a plurality of second synchronizers engaging the one of the driven gears to the output shaft such that the one of the driven gears transmits the power of the counter shaft to the output shaft after the rotation speed is synchronized;

a control finger operating such that the one of the driven gears is engaged to a predetermined shift-speed, wherein the control finger comprises a first finger operating the first synchronizer, and a second finger operating one of the second synchronizers;

a plurality of shift lugs corresponding to the predetermined shift-speeds and operating the first synchronizer and the one of the second synchronizers by an operation of the control finger, wherein the plurality of shift lugs includes a first shift lug operated by the first finger such that the first synchronizer is operated, and a plurality of second shift lugs operated by the second finger such that the one of the second synchronizers is operated;

wherein the second finger and the first finger are integrally connected to one another and configured such that the first finger operates the first shift lug while the second finger simultaneously operates one of the plurality of second shift lugs;

wherein the first synchronizer comprises exactly one first synchronizer, and the second synchronizers comprise one less second synchronizer than there are driven gears, wherein the first synchronizer comprises:

a sleeve connected to the output shaft to be able to move in an axial direction of the output shaft;

a key assembly supporting the sleeve;

a synchronizer assembly synchronizing the rotation speed of the output shaft to the rotation speed of the counter shaft by connecting with the sleeve;

a hub transmitting the power to the sleeve; and a gear clutch transmitting the power from the driven gears to the output shaft.

2. The manual transmission of claim 1, wherein each of the second synchronizers comprises:

a sleeve connected to the output shaft to be able to move in an axial direction of the output shaft;

a hub transmitting the power to the sleeve; and a gear clutch transmitting the power from a corresponding one of the driven gears to the output shaft.

3. The manual transmission of claim 1, wherein the first synchronizer is operated together with one of the plurality of second synchronizers.

* * * * *